United States Patent
Moder et al.

(10) Patent No.: US 11,167,386 B2
(45) Date of Patent: Nov. 9, 2021

(54) IDENTIFICATION DEVICE FOR A TOOL OR AN ASSEMBLY

(71) Applicant: TURCK Holding GmbH, Halver (DE)

(72) Inventors: Ralf Moder, Kornwestheim (DE); Rene Steiner, Hagen (DE)

(73) Assignee: TURCK HOLDING GMBH, Halver (DE)

( * ) Notice: Subject to any disclaimer, the term of this patent is extended or adjusted under 35 U.S.C. 154(b) by 165 days.

(21) Appl. No.: 16/367,454

(22) Filed: Mar. 28, 2019

(65) Prior Publication Data
US 2019/0299347 A1 Oct. 3, 2019

(30) Foreign Application Priority Data

Mar. 29, 2018 (DE) ..................... 10 2018 107 536.7

(51) Int. Cl.
*B23Q 3/157* (2006.01)
*G06K 19/00* (2006.01)
(Continued)

(52) U.S. Cl.
CPC ..... *B23Q 3/15546* (2013.01); *G06K 19/0723* (2013.01); *B23Q 3/15722* (2016.11); *Y10T 483/10* (2015.01); *Y10T 483/134* (2015.01)

(58) Field of Classification Search
CPC . B23Q 3/15546; B23Q 3/155–3/15793; B23Q 1/0009; B23Q 17/0995;
(Continued)

(56) References Cited

U.S. PATENT DOCUMENTS

| 4,850,766 A | * | 7/1989 | Furuhashi | ............. | B23B 31/006 |
| | | | | | 409/234 |
| 6,585,628 B1 | * | 7/2003 | Tsung | ...................... | B23C 5/00 |
| | | | | | 408/16 |

(Continued)

FOREIGN PATENT DOCUMENTS

| CN | 210160421 U | * | 3/2020 |
| CN | 210281533 U | * | 4/2020 |

(Continued)

OTHER PUBLICATIONS

Machine Translation of JP 2002-137149 A, which JP '149 was published May 2002.*

(Continued)

*Primary Examiner* — Erica E Cadugan
(74) *Attorney, Agent, or Firm* — Leydig, Voit & Mayer, LTD.

(57) ABSTRACT

A device for the identification of a tool which is accommodated in a tool holder includes a read/write head configured to communicate with an RFID transponder. The read/write head extends above and/or below the tool holder over at least 70% of an overall diameter of the tool holder. The tool holder has a longitudinal axis and, on its side, a recess which is formed perpendicular to the longitudinal axis of the tool holder and in which the RFID transponder is inserted such that the transfer curve of the RFID transponder runs upwards and/or downwards, as seen from the recess, in a direction of the longitudinal axis of the tool.

12 Claims, 5 Drawing Sheets

(51) Int. Cl.
　　　*G06K 19/073*　　(2006.01)
　　　*B23Q 3/155*　　(2006.01)
　　　*G06K 19/07*　　(2006.01)

(58) Field of Classification Search
　　　CPC ............ Y10T 483/134; B23B 2231/10; G06K 19/0723; G05B 2219/49305
　　　USPC .......................................................... 483/9
　　　See application file for complete search history.

(56) References Cited

U.S. PATENT DOCUMENTS

| | | | |
|---|---|---|---|
| 8,376,671 B2 * | 2/2013 | Kaneko | B23Q 3/15546 409/233 |
| 2005/0230110 A1 | 10/2005 | McClung, III et al. | |
| 2007/0199983 A1 * | 8/2007 | Thyssen | B23F 23/00 235/375 |
| 2018/0126505 A1 * | 5/2018 | Hackman | G06K 19/005 |

FOREIGN PATENT DOCUMENTS

| | | | |
|---|---|---|---|
| DE | 102019126599 A1 | * | 4/2021 |
| EP | 1746530 A1 | | 1/2007 |
| JP | 04-304943 A | * | 10/1992 |
| JP | 2002-137149 A | * | 5/2002 |
| JP | 2003-025176 A | * | 1/2003 |
| JP | 2018-001327 A | * | 1/2018 |
| JP | 2020-087430 A | * | 6/2020 |

OTHER PUBLICATIONS

Article "Disk read-and-write head", accessed from https://en.wikipedia.org/wiki/Disk_read-and-write_head on Jun. 9, 2021, 4 pages.*

Entry for "read/write head" in PC Mag Encyclopedia, accessed from https://www.pcmag.com/encyclopedia/term/readwrite-head on Jun. 9, 2021, 6 pages.*

Article "Read/Write Head" from Techopedia Dictionary, accessed from https://www.techopedia.com/definition/9112/readwrite-head on Jun. 9, 2021, 10 pages.*

* cited by examiner

Embodiment Wherein the Read/Write Head is Formed as a Circular Disc With an Inner Diameter and an Outer Diameter

Fig. 5

IDENTIFICATION DEVICE FOR A TOOL OR AN ASSEMBLY

CROSS REFERENCE TO RELATED APPLICATIONS

This application claims benefit to German Patent Application No. DE 10 2018 107 536.7, filed Mar. 29, 2018, which is incorporated by reference herein.

FIELD

The present invention relates to an identification device for a tool or an assembly (only tools are referred to below for the sake of simplicity), in particular for a tool in a wood, plastic or metal processing machine, and to a method for the identification of a tool.

BACKGROUND

There is known from EP 1 746 530 B1 a device for tool and assembly identification which aims to avoid the recognized disadvantage that on rotating tools with identification by a laterally mounted RFID transponder, reading can only take place with suitable orientation. As a solution EP 1 746 530 B1 therefore proposes mounting an RFID chip over the entire circumference of a tool holder, so that the RFID chip can be read by a laterally provided read/write apparatus regardless of the orientation of the tool holder. A disadvantage is that this RFID chip is very large in dimension and must be affixed on metal—this leads to the annular RFID chip often becoming detached in the event of loading during the processing.

SUMMARY

In an embodiment, the present invention provides a device for the identification of a tool which is accommodated in a tool holder. The device includes a read/write head configured to communicate with an RFID transponder, wherein the read/write head extends above and/or below the tool holder over at least 70% of an overall diameter of the tool holder. The tool holder has a longitudinal axis and, on its side, a recess which is formed perpendicular to the longitudinal axis of the tool holder and in which the RFID transponder is inserted such that the transfer curve of the RFID transponder runs upwards and/or downwards, as seen from the recess, in a direction of the longitudinal axis of the tool.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5 schematically shows a further feature according to the present invention.

DETAILED DESCRIPTION

Figure 1:
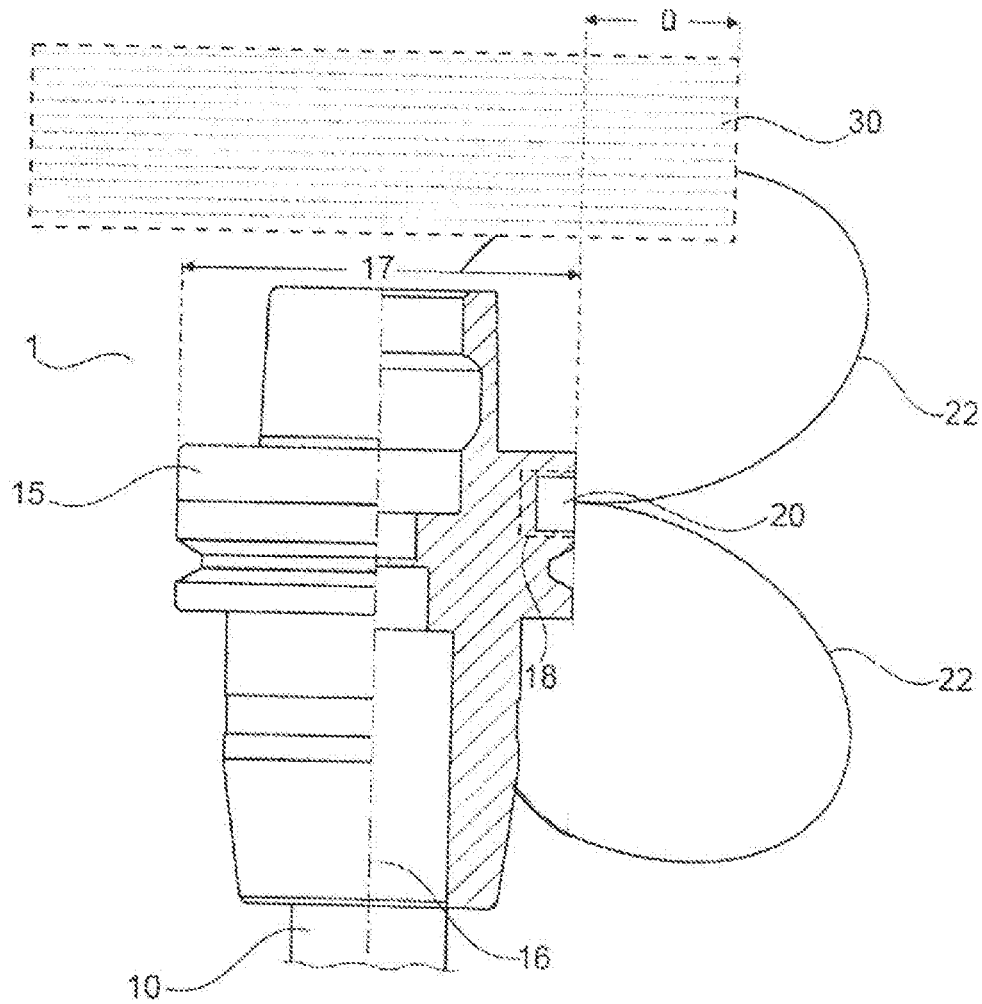
FIG. 1 illustrates a schematic representation of a device for the identification of a tool, with a tool holder in section along the longitudinal axis of the tool holder.

Embodiments of the invention provide identification devices for a rotating tool that avoid disadvantages of the state of the art and that, in particular, enable more robust identification regardless of an orientation of the tool holder.

According to an embodiment of the invention, a device is provided for the identification of a tool which is accommodated in a tool holder, preferably in a substantially rotationally symmetrical tool holder, wherein the tool holder has a longitudinal axis, preferably the axis of rotation, and a diameter and wherein the tool holder has a recess on its side, which is formed perpendicular to the longitudinal axis of the tool holder and in which an RFID transponder is inserted such that the transfer curve of the RFID transponder runs upwards and/or downwards, seen from the recess, in the direction of the longitudinal axis of the tool, and the device has a read/write head (RWH) for communicating with the RFID transponder, wherein the read/write head extends above and/or below the tool holder over at least 70% of the overall diameter of the tool holder.

The tool holder can be rotated about its longitudinal axis and is preferably itself substantially rotationally symmetrical. The longitudinal axis of the tool holder is thus preferably the axis of rotation. The tool holder is preferably a hollow shank taper. The tool holder preferably comprises a body and a shaft, in which a tool can be clamped.

The tool holder has a diameter. This is larger in the area of the body than in the area of the shaft. The maximum diameter is then present in the area of the body of the tool holder.

On its side, preferably on its outer area of the maximum diameter, the tool holder has a recess. The recess is preferably formed as a hole or blind hole. The recess is preferably formed perpendicular to the longitudinal axis of the tool holder. The recess is preferably located at the level of the point of maximum diameter, therefore in particular on the side of the body of the tool holder. The recess is particularly preferably located at a point of the tool holder at which the diameter of the tool holder is at least 70% or 80%, preferably at least 90%, of the maximum diameter.

An RFID transponder is inserted into the recess such that the transfer curve of the RFID transponder runs upwards and/or downwards, seen from the recess, in the direction of the longitudinal axis of the tool. The transfer curve is the visualisation of the receiving range of the RFID transponder in space. The transfer curve is the 3-dimensional range in which communication between data carrier and read/write head is possible. The sensitivity for communication is highest close to the RFID transponder, and a minimum of the sensitivity or energy required for communication is still present at the edges of the transfer curve.

This transfer curve or the geometry of the receiving range of the RFID transponder can be influenced generally by the choice of RFID transponder, the installation location of the RFID transponder, the temperature applied, installation locations of tag and antenna or read/write head, orientation of tag to antenna or read/write head, enclosed metals, motors, drives and EMC. Unlike the state of the art, it is a question of forming the transfer curve upwards and/or downwards, seen from the recess, in the direction of the longitudinal axis of the tool, while in the state of the art a transfer curve is preferred that is formed perpendicularly away from the longitudinal axis of the tool holder. Due to a lobe-shaped formation of the transfer curve, for example, upwards and/or downwards, an area is reached above and/or below the tool holder or the body of the tool holder.

In addition, a read/write head (antenna) is provided for communication, i.e. for exchanging data with the RFID transponder, wherein the read/write head is arranged above and/or below the tool holder. The read/write head is preferably arranged above the tool holder and thus above the body of the tool holder. It is thereby possible for the RFID transponder, the transfer curve or radiation geometry of which is oriented upwards, to be able to communicate with the read/write head.

Due to the fact that the read/write head preferably extends over at least the entire diameter of the tool holder, and the transfer curve or the radiation geometry of the RFID transponder reaches upwards and/or downwards, communication is possible in any position around 360° of the (rotating) tool, as it is now irrelevant at which point the recess in which the RFID transponder is arranged is located inside the tool holder. The read/write head lies in any position in the range of the transfer curve or the radiation geometry of the RFID transponder, which is only arranged on one side of the tool holder. Independence from the orientation of the tool holder is thus achieved.

According to an embodiment of the invention, the RFID transponder is a ferritic RFID transponder. The magnetizable or ferritic material shields the transmitting and/or receiving device and/or its antenna from metal objects in the vicinity. The effectiveness and range or detectability of the transmitting and/or receiving device is thus protected or at least preserved from being restricted too strongly. In particular, magnetic fields are aligned by the ferrite and inductive coupling is increased.

According to a further embodiment of the invention, the RFID transponder is bar-shaped, and the core of the transponder or the ferrite core is preferably bar-shaped, wherein the transponder itself including the housing enclosing it can be round and has a diameter of preferably 10 mm. The RFID transponder is preferably inserted into the recess parallel to the longitudinal axis of the tool holder. This means that the longitudinal axis of the bar-shaped RFID transponder or of the bar-shaped core of the transponder is oriented parallel to the longitudinal axis of the tool holder and is located in the periphery of the tool holder.

The position of the bar-shaped transponder can preferably diverge by up to 5 degrees, particularly preferably by up to 10 degrees and in particular preferably by up to 20 degrees about each of its two axes besides its longitudinal axis.

A radiation geometry with two bipolar maxima is preferably created by this, in which a maximum is produced in the direction above the tool holder and a maximum in the direction below the tool holder laterally by the RFID transponder.

In a further embodiment example of the invention, the bar-shaped RFID transponder has a length of less than 10 mm. It is possible in this way to house the RFID transponder even in existing standard holes, such as for example the openings present as standard in a hollow shank taper.

In another embodiment example of the invention, the read/write head extends over at least 80%, 100%, 110%, preferably 120%, particularly preferably 130% of the diameter of the tool holder. A negative or positive overhang of the read/write head is thus created with respect to the maximum diameter of the tool holder and thus the position of the RFID transponder. Due to this overhang, a portion of the read/write head is always located in the area into which the RFID transponder radiates, i.e. the radiation geometry of the RFID transponder is always located in a section of the read/write head. Since the transfer curve or the radiation geometry is only located on one side of the tool holder, this also overlaps with the read/write head only at one point, which is sufficient, however, so that regardless of the rotation orientation of the tool holder, an overlap of the transfer curve or the radiation geometry with the read/write head occurs in any position. An overhang of more than 5 mm, particularly preferably of more than 10 mm, in particular preferably of more than 20 mm is particularly preferably provided.

The read/write head can preferably be formed rectangular or also square, preferably with an edge length of 60 mm, preferably 80 mm, particularly preferably 100 mm. It is particularly preferable for the read/write head to be formed circular. It thus follows in the shape of the rotational symmetry of the rotating tool holder. It is particularly preferable if the read/write head is formed as a circular disc with an inner diameter Ri and an outer diameter Ra. Ri is then preferably smaller than or equal to the diameter of the tool holder.

The tool holder is particularly preferably formed in the form of a hollow shank taper. It is thus possible to use existing systems for tool changing.

In another embodiment example, a device is provided that comprises several tool holders which can be accommodated in an exchange holder and wherein the exchange holder can be moved such that the individual tool holders accommodated in the exchange holder pass the read/write head.

An exchange holder is preferably a magazine in which several tool holders are placed and can be accommodated by a spindle of the processing apparatus. The exchange holder or the magazine is preferably formed in the shape of a revolver drum, so that the transport of the individual tool holders can take place by rotating the exchange holder.

The read/write head is particularly preferably mounted on a station which is passed by the exchange holder, so that the tool holders pass the read/write head, i.e. pass above or below it. A consecutive and discrete reading of the individual RFID transponders is thus possible on the tool holders through the exchange holder. The individual tool holders are thus identifiable during the passing process, without an entry of the read/write head having to take place with the magazine stopped and without adhering to a specific rotation direction in the case of a laterally mounted read/write head.

The tool with the tool holder is particularly preferably insertable into a processing machine for the wood and/or plastic and/or metal industry.

Embodiments of the invention further provide methods for the identification of a tool which is accommodated in a tool holder, wherein the tool holder has a longitudinal axis and a diameter. A method according to an embodiment of the invention includes the following steps: provision of a recess on one side of the tool holder, wherein the recess is formed perpendicular to the longitudinal axis of the tool holder; provision of an RFID transponder in the recess, so that the transfer curve of the RFID transponder runs upwards and/or downwards, seen from the recess, in the direction of the longitudinal axis of the tool; provision of a read/write head for communicating with the RFID transponder, wherein the read/write head extends above and/or below the tool holder over at least the entire diameter of the tool holder; guiding past of the tool holder above or below the read/write head, so that this dips into the transfer curve of the RFID transponder; and communication between the read/write head and the RFID transponder to identify the tool.

FIG. 1 is a schematic representation of a device 1 for the identification of a tool 10 with a tool holder 15 in section along the longitudinal axis 16 of the tool holder 15. A tool holder 15 consists of a body and a shaft, in which a tool 10 is clamped. The tool holder 15 is formed in the manner of a hollow shank taper HST. The tool holder 15 has a maximum diameter 17. On one side of the tool holder 15—on the right side in the illustration—a recess 18 is provided into which an RFID transponder 20 is inserted. A read/write head 30 is arranged above the tool holder 15. This read/write head 30 has an overhang Ü with respect to the tool holder 15 and in particular with respect to the maximum diameter 17 of the tool holder 15, and extends right and left from the tool holder and beyond this by the overhang Ü.

Figure 4:
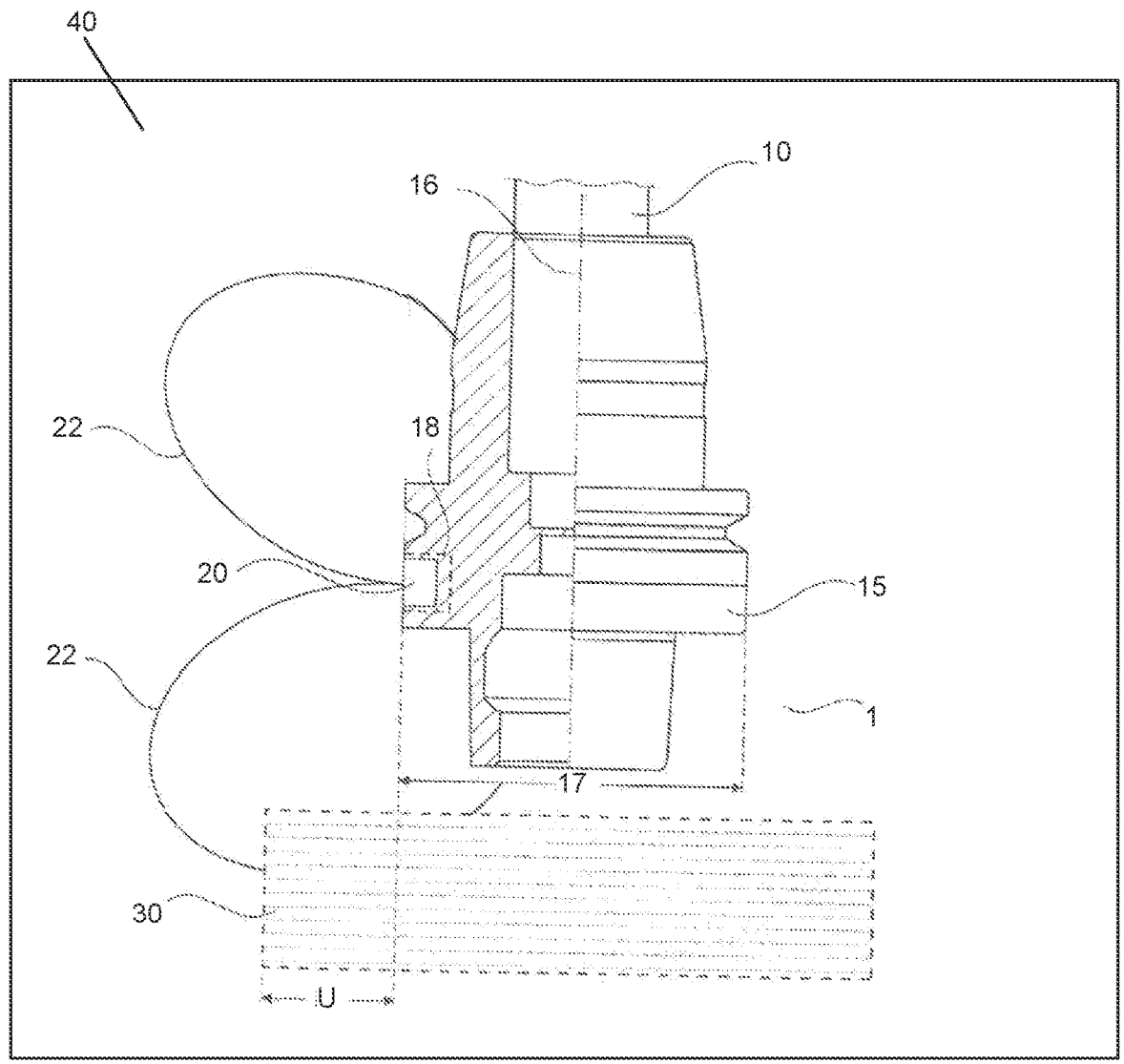
FIG. 4 illustrates a schematic representation of a device for the identification of a tool, with a tool holder in section along the longitudinal axis of the tool holder.

FIG. 4 is a schematic representation of a device 1 for the identification of a tool 10 with a tool holder 15 in section along the longitudinal axis 16 of the tool holder 15. A processing machine 40 includes the device 1. A tool holder 15 consists of a body and a shaft, in which a tool 10 is clamped. The tool holder 15 is formed in the manner of a hollow shank taper HST. The tool holder 15 has a maximum diameter 17. On one side of the tool holder 15 —on the left side in the illustration—a recess 18 is provided into which an RFID transponder 20 is inserted. A read/write head 30 is arranged below the tool holder 15. This read/write head 30 has an overhang U with respect to the tool holder 15 and in particular with respect to the maximum diameter 17 of the tool holder 15, and extends right and left from the tool holder and beyond this by the overhang U.

The tool holder 15 is formed substantially rotationally symmetrical and has a longitudinal axis 16. The RFID transponder 20 is arranged in the recess 18 at the edge on one side of the tool holder in the region of the periphery of the maximum diameter 17 of the tool holder 15. The radiation or transfer curve 22 of the RFID transponder 20 is represented as a section of the spatial geometry of the transmission power of the RFID transponder 20 in space.

If the tool holder 15 is now located under the read/write head 30, as shown in FIG. 1, the transfer curve 22 overlaps with the spatial extension of the read/write head 30—thus the read/write head 30 and the RFID transponder 20 can communicate with each other and transfer the data. This data can preferably be selected from the following group: type of tool, identification number, dimensions, maximum speed, maximum feed rate, frequency of use, tool life, durability. The read/write head 30 is particularly preferably connected to a control unit (not shown), via which the operation of the processing apparatus and the tool change can be controlled.

Figure 2:
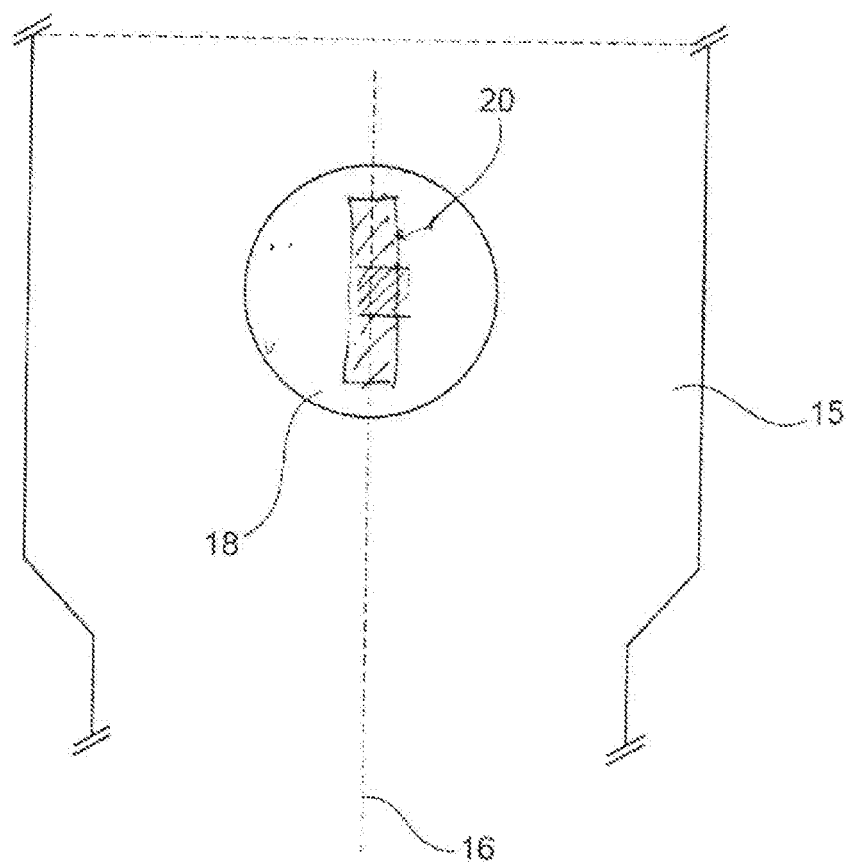
FIG. 2 illustrates a detailed view of an RFID transponder in the recess of the tool holder.

FIG. 2 is a detailed view of an RFID transponder 20 which is arranged in the recess 18 of the tool holder 15. It is a plan view of the recess 18. The core of the RFID transponder 20 has the shape of a bar and is oriented parallel to the longitudinal axis 16.

With this installation geometry, a radiation geometry is achieved such as is represented in FIG. 1 by the reference number 22 in section with the plane shown there. An overlap of this radiation geometry with the read/write head is thus guaranteed.

Figure 3:
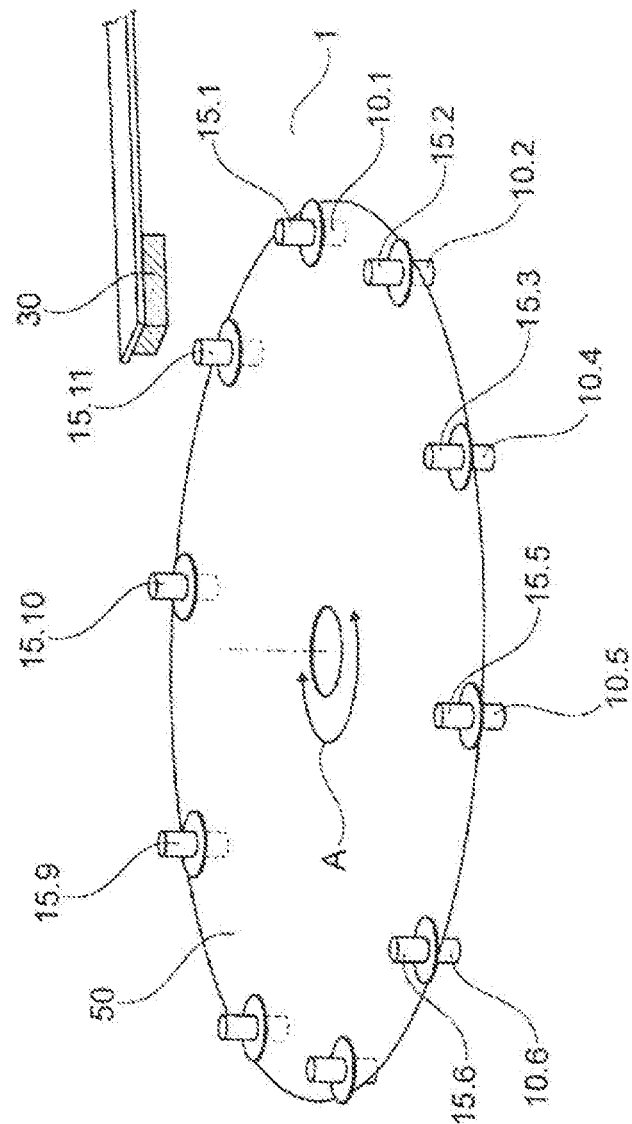
FIG. 3 illustrates a representation of a device for the identification of a tool with an exchange holder for several tool holders.

FIG. 3 is a representation of a device 1 for the identification of a tool 10 with an exchange holder 50 for several tool holders 15. The various tool holders are denoted by the reference numbers 15.1 to 15.11. Corresponding tools 10.i are clamped in the tool holders 15.i. A read/write head 30 is arranged on a station. This head is arranged above the tool holders 15.i. In FIG. 3 it is currently above the tool holder 15.1 in the position of the exchange holder 50.

It is likewise possible to mount the RFID reader, i.e. the read/write head 30, below the exchange holder 50. This is particularly advantageous if the tool holder 15.i is inserted into the exchange holder 50 rotated by 180 degrees.

By rotating the exchange holder 50 it is now possible to identify a tool 10.i with the tool holder 15.i by the read/write head 30 without requiring a scanning step by the read/write head 30, and thus the identification can take place in continuous operation, i.e. the exchange holder can be turned along the arrow A and the tool can hereby be identified without having to stop the exchange holder.

It is thus possible with the device according to the invention to identify a tool (e.g. a hollow shank taper HST) on a machine (e.g. wood processing machine) with RFID. This identification does not influence the function of the machine, i.e. the HST can be identified in any rotation position and no additional mechanical extensions are required for orientation or for movement of the identification component (RFID tag, RWH). Identification is thus possible in so-called continuous operation. This is preferably effected by the orientation of a ferritic RFID transponder in a tool holder (hollow shank taper) in connection with the orientation of a read/write head above or below the tool holder, so that the identification of the data carrier is possible regardless of the rotation position of the HST.

No additional mechanical extensions are required for orientation or for movement of the identification components (tag, RWH). Due to this arrangement of the RFD transponder (tag) and RWH, identification is possible in so-called continuous operation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS 1 device for the identification of a tool
10 tool 15 tool holder
15' hollow shank taper
16 longitudinal axis of the tool holder
17 diameter of the tool holder
18 recess in the tool holder
20 RFID transponder
22 transfer curve
30 read/write head
40 processing machine
50 exchange holder for several tool holders

The invention claimed is:

1. A device for the identification of a tool which is accommodated in a tool holder, the device comprising:
   a read/write head configured to communicate with a radio frequency identification (RFID) transponder,
   wherein the read/write head is configured to extend above or below the tool holder over at least 70% of an overall diameter of the tool holder,
   wherein the tool holder has a longitudinal axis, and
   wherein the tool holder has, on its-a side of the tool holder, a recess extending perpendicular to the longitudinal axis of the tool holder and in which the RFID transponder is inserted such that a transfer curve of the RFID transponder runs upwards and/or downwards, as seen from the recess, in a direction of the longitudinal axis of the tool holder.

2. The device according to claim 1, wherein the RFID transponder is a ferritic RFID transponder.

3. The device according to claim 1, wherein the RFID transponder has a shape of a bar and is inserted into the recess, a length of the bar extending parallel to the longitudinal axis of the tool holder.

4. The device according to claim 3, wherein the bar-shaped RFID transponder has a length of less than 10 mm.

5. The device according to claim 1, wherein the read/write head extends over at least 80% of the overall diameter of the tool holder.

6. The device according to claim 1, wherein the read/write head is formed as a circular disc with an inner diameter and an outer diameter.

7. The device according to claim 1, wherein the tool holder is formed in a shape of a hollow tapered shaft.

8. The device according to claim 1, wherein the device further comprises a plurality of tool holders, the plurality of tool holders including the tool holder, the plurality of tool holders being configured to be accommodated in an exchange holder, and wherein the exchange holder is configured to be moved such that the individual tool holders accommodated in the exchange holder pass the read/write head.

9. The device according to claim 1, wherein the tool with the tool holder is insertable into a processing machine.

10. A processing machine, the processing machine comprising the device according to claim 1.

11. A method for the identification, via the device according to claim 1, of the tool which is accommodated in the tool holder, the method comprising:
    providing the read/write head configured to communicate with the RFID transponder, wherein the read/write head extends above or below the tool holder over at least 70% of the overall diameter of the tool holder.

12. The method according to claim 11, the method further comprising:
    guiding past of the tool holder above or below the read/write head, so that the tool holder dips into the transfer curve of the RFID transponder; and
    communicating between the read/write head and the RFID transponder to identify the tool.

* * * * *